Patented Feb. 16, 1932

1,845,917

UNITED STATES PATENT OFFICE

JUDSON D. HOWARD, OF KLAMATH FALLS, OREGON, ASSIGNOR OF NINETY-EIGHT ONE-HUNDREDTHS TO ARTHUR W. GRUBB, OF KLAMATH FALLS, OREGON

METHOD OF DESTRUCTIVE DISTILLATION OF WOOD WASTE

No Drawing.    Application filed September 12, 1929.   Serial No. 392,253.

This invention relates to a method of destructive distillation of matter such as wood having certain advantages over the prior art, as follows.

Finely ground wood of all types may be destructively distilled without caking.

A more thorough elimination of volatile matter from the charge is obtained.

The products of distillation by this method are superior in many cases to the products produced by former methods. The residue has certain properties not shown by the residues of former processes which may be advantageously used.

Other advantages will be obvious from the appended disclosure and claims.

In the past it has been very difficult to successfully distill finely ground woods, and especially those woods having a large proportion of tarry, resinous, gummy and other like substances. When finely ground wood such as sawdust and the like is subjected to destructive distillation it tends to agglomerate and form sticky, gummy matter which entraps the volatile substances and absorbs them likewise by occlusion, solution and the like.

This fact has made certain woods unprofitable for destructive distillation in some cases and in other cases has made it necessary to distill the more difficult large pieces of wood.

High temperatures have been necessary in destructive distillation in many woods and many forms of wood due to the oily, gummy, resinous, etc., matters contained therein.

This invention avoids these former disadvantages in a simple, efficient manner to obtain the advantages heretofore set forth.

When a wood is to be destructively distilled I comminute it to a fine degree if it is not already in that state and thoroughly mix with it a certain amount of silicious earth, i. e., diatomaceous earth, infusorial earth, kieselguhr or the like. The amount necessary to obtain the results desired will vary from 15 to 30%, depending upon the amount of tarry, resinous, gummy and other such matter.

In trials I have found no wood requiring less than 15% of the kieselguhr or the like, nor more than 30% of the same.

Definite proportions cannot be given for all cases, as tarry, resinous and the like matters in various woods vary from tree to tree, but the amount necessary is not critical and is readily determined.

Too high percentage of the earth up to or above 30% is not fatal to the success of the process but merely adds to the cost for the material.

The wood to be thus distilled should be at least fine enough to pass a one inch mesh screen and preferably should be ground to a powder.

It is to be understood that the infusorial earth or the like is to be very completely mixed with the finely ground wood before the distillation is to take place.

In the distillation according to this invention the tarry, resinous matter, gummy matter and the like will tend to break up to a certain extent into more volatile substances which readily distill, and there is very little loss of volatile matter by entrapping the same in gums, occlusion of the same, solution of the same, etc., and a greater amount of volatile matter is obtained than by former processes.

It will often be found that the temperature necessary to distill the wood or other matter of like nature will be lower when practicing this invention than formerly. This results in a saving of fuel.

The retorts used formerly in the destructive distillation will serve for practicing this invention.

The residue will be found to be relatively fine and free from tackiness and may be advantageously used wherever matter of this nature is desirable, due to its low content of volatile matter and its relative dryness.

This invention is of particular value for use with the softer woods but is not confined to these. It will serve admirably for preventing the agglomeration of fine material or almost any material being destructively distilled which tends to release or form tarry, gummy, resinous and the like matters.

What I claim as my invention is:

1. A process for the destructive distillation of wood which comprises mixing the wood with a quantity of silicious earth amounting to 15 to 30% of the wood and subjecting the mixture to heat in a retort until carbonization of the wood is effected.

2. A process for the removal of volatile matter from comminuted wood which comprises mixing 15 to 30% of diatomaceous earth with said comminuted wood and subjecting the mixture to heat sufficient to effect destructive distillation thereof.

In testimony whereof I affix my signature.
JUDSON D. HOWARD.